United States Patent

[11] 3,583,509

[72] Inventor Winfried Stachnik
     Zweibrucken, Germany
[21] Appl. No. 826,400
[22] Filed May 21, 1969
[45] Patented June 8, 1971
[73] Assignee Deere & Company
     Moline, Ill.
[32] Priority Aug. 2, 1968
[33] Germany
[31] P 17 80 113.7

[54] ENDLESS TRACK ATTACHMENT FOR SELF-PROPELLED VEHICLE
     9 Claims, 4 Drawing Figs.
[52] U.S. Cl. ................................................... 180/9.5, 180/9.62
[51] Int. Cl. ..................................................... B62d 55/12
[50] Field of Search ........................................... 305/57; 180/9.62, 9.5, 9.2 CD

[56] References Cited
UNITED STATES PATENTS

| 1,388,750 | 8/1921 | Palmer | 180/9.5X |
| 1,830,911 | 11/1931 | Moore | 180/9.62X |
| 2,588,333 | 3/1952 | Wilson | 180/9.62X |

FOREIGN PATENTS

| 969,859 | 7/1958 | Germany | 180/9.62 |

Primary Examiner—Richard J. Johnson
Attorneys—H. Vincent Harsha, Raymond L. Hollister, Harold M. Knoth, William A. Murray and John M. Nolan ABSTRACT: An endless track attachment for self-propelled vehicles in which the driving sprocket is carried by the track frame through a spherical bearing and is connectable to a hub on a driving axle. An adjustable support means is provided to engage the sprocket and prevent it pivoting about the spherical bearing when removed from the hub. With the sprocket held up by the support means, the attachment can be mounted on an dismounted from a vehicle as a unitary structure.

INVENTOR.
WINFRIED STACHNIK

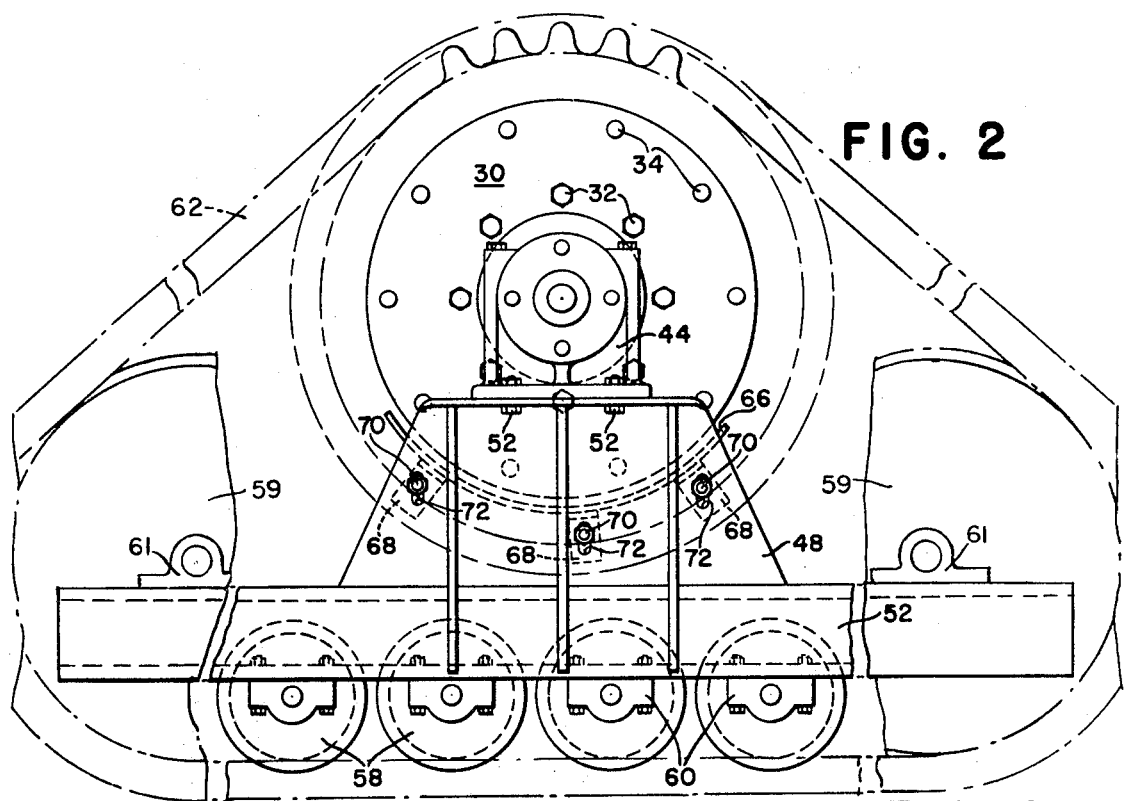
FIG. 2
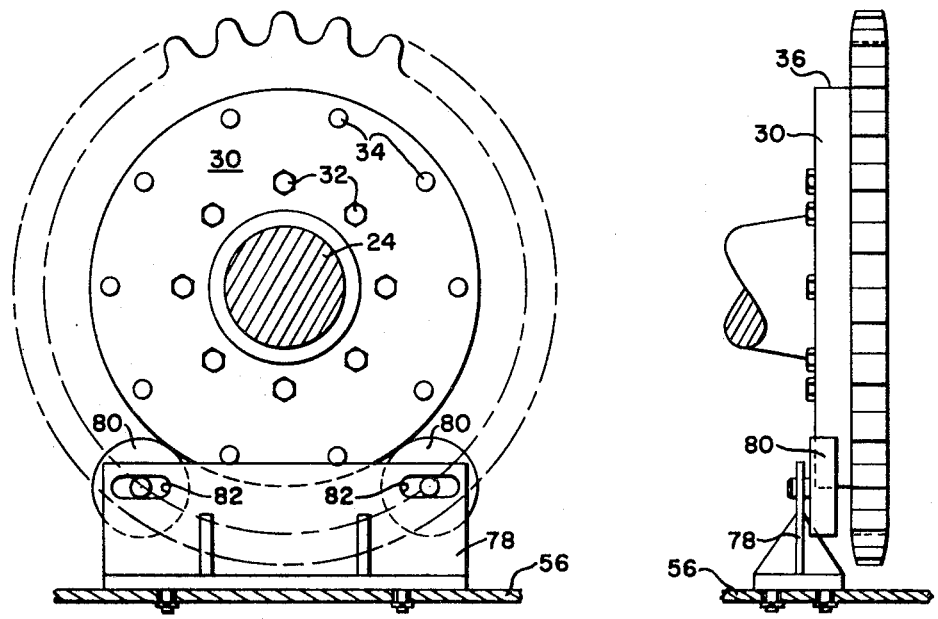
FIG. 4
FIG. 3
INVENTOR.
WINFRIED STACHNIK

ENDLESS TRACK ATTACHMENT FOR SELF-PROPELLED VEHICLE

BACKGROUND OF THE INVENTION

The present invention relates generally to endless track attachments for self-propelled vehicles, and more particularly relates to such attachments that can be mounted on and dismounted from a vehicle without dismantling the attachment into its various components.

With many self-propelled vehicles, for example, rice combines, it is desirable to be able to switch from the conventional rubber tires to endless track drives in order to operate efficiently under all conditions. To this end, many endless track attachments have been proposed, but none have been entirely satisfactory. In some proposals, the drive sprocket is removably secured to a hub on the driving axle and is carried by the track frame through a spherical bearing so that a small amount of self-leveling of the track frame is possible without imposing large forces on the axle. Such systems performed very well, but conversion between rubber tires and endless tracks was very cumbersome and time consuming since the track attachment had to be disassembled into its various components by removing the track, then the track frame, and finally the sprocket. In other proposals, the drive sprocket was rigid with the hub and the track frame. These systems were easy to convert, but when traveling over uneven terrain, they were rigid with the axle and subjected the axle to damaging forces.

SUMMARY OF THE INVENTION

The principle object of the present invention is to provide and endless track attachment for self-propelled vehicles in which the drive sprocket is freed to move relative to the track frame and which can be mounted on and dismounted from the vehicle axle without removal of the track and sprocket from the frame.

According to the present invention, the drive sprocket for an endless track attachment is connected directly to the track frame through a spherical bearing which affords both rotational and pivotal movement of the sprocket relative to the frame. A support is carried by the track frame for engagement with the sprocket and prevents the sprocket from pivoting downwardly about the spherical bearing when disconnected from the axle hub. The track attachment can thus be mounted on or removed from the vehicle without being disassembled.

According to another feature of the invention, the support is adjustably carried by the frame so that it can be moved between a first position in which it engages and supports the sprocket and a second position in which it is removed from and does not interfere with the operation of the sprocket.

In one embodiment of the invention, the support takes the form of a semispherical bearing positioned under an annular shoulder provided on the drive sprocket while in another embodiment of the invention, the support takes the form of a pair of rollers positioned under the shoulder on the drive sprocket.

Accordingly, additional objects of the invention are to provide an endless track attachment for self-propelled vehicles in which the drive sprocket is connected directly to the track frame for universal pivotal movement, and to provide an adjustable support for the drive sprocket when it is disconnected form the hub of the vehicle.

The above objects and additional objects and advantages of the invention will become apparent along with the details of construction of preferred embodiments of the invention from a reading of the following detailed description when taken in conjunction with the accompanying drawings.

BRIEF DESCRIPTION OF THE DRAWINGS

In the drawings:

FIG. 2 is a fragmentary side elevational view of the attachment illustrated in FIG. 1;

FIG. 3 is a view similar to FIG. 2 illustrating a second embodiment of the invention; and FIG. 4 is an end elevational view of the structure illustrated in FIG. 3.

DESCRIPTION OF THE PREFERRED EMBODIMENTS

Figure 1:
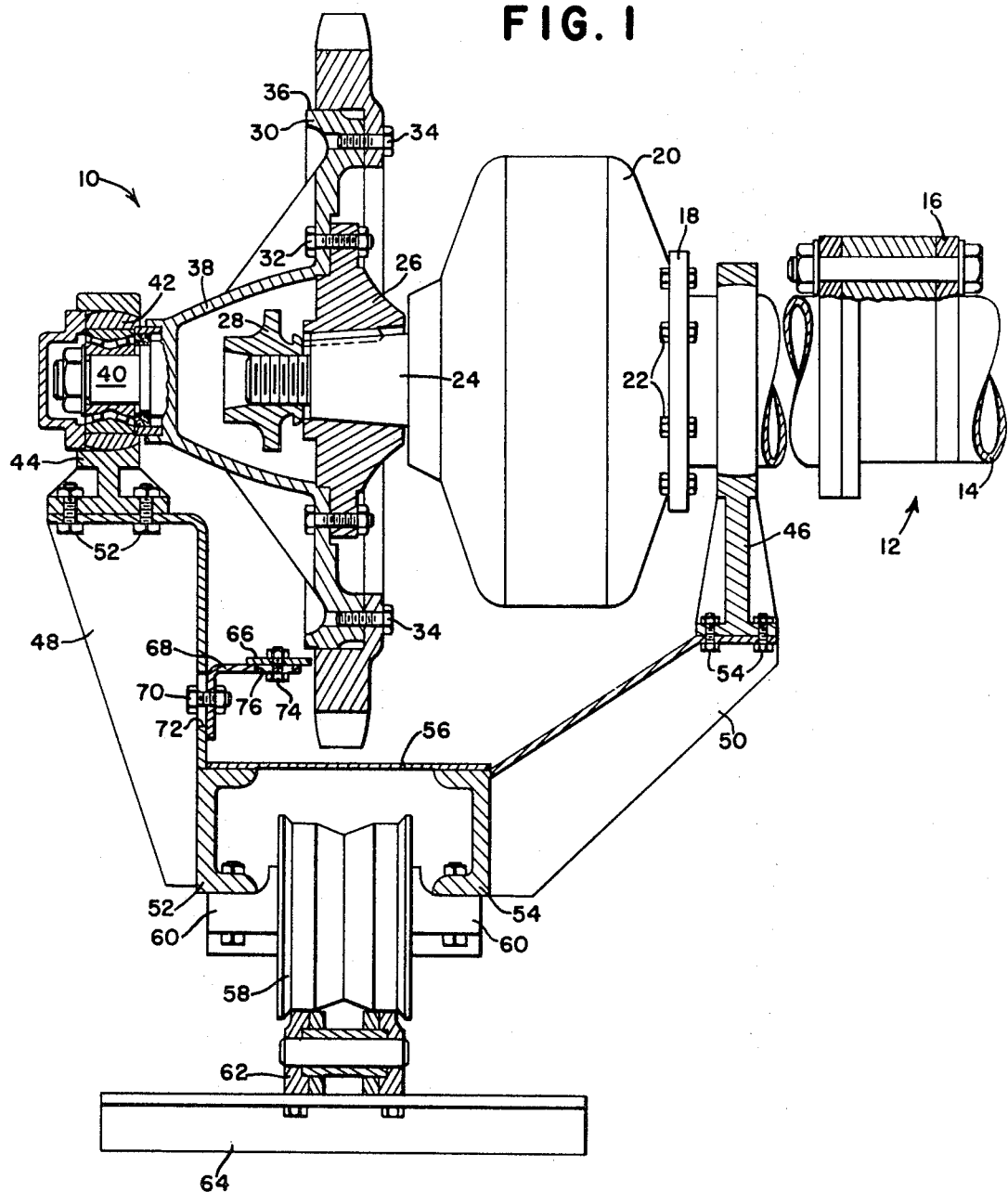
FIG. 1 is a sectional view of an endless track attachment mounted on a vehicle axle.

Referring now to the drawings, an endless track attachment indicated generally at 10 is illustrated as being mounted on the outer end of an axle indicated generally at 12. The axle 12 includes an axle housing 14 which is secured to the vehicle by a bracket 16. The axle housing 14 is provided with a flange 18 at its outer end which is detachably connected to a gearbox or final drive housing 20 by bolts 22. An axle drive shaft is journaled within the axle housing 14 and drives a tapered output shaft 24 through the final drive 20. A hub 26 is wedged onto the output shaft 24 and is retained thereon by nut 28. Since the endless track attachment according to the present invention is usable on axle without a final drive, it should be understood that the final drive housing 20 merely constitutes an extension of an forms part of the axle housing and the output shaft 24 merely constitutes and extension of and forms part of the axle drive shaft.

The sprocket wheel 30 of the endless track attachment is secured to the hub 26 by means of bolts 32. The sprocket wheel 30 is made from two pieces with the outer sprocket portion being secured to the inner wheel portion by bolts 34 so that the outer sprocket portion can be replaced when it becomes worn. Also, by making the drive sprocket 30 of two pieces the outer sprocket portion can be of a size to leave a small portion of the outer periphery of the inner wheel portion exposed to provide an annular shoulder 36 for a purpose which will become apparent hereinafter. The sprocket wheel 30 has a cylindrical housing 38 extending from one side thereof which surrounds the outer end of the output shaft 24 and acts as a dust cap. At its outer end, the cylindrical housing 38 carries a stub shaft 40 which is rotatably mounted in a bearing 42 carried by a bearing bracket 44. The outer race of the bearing 42 has a generally spherical outer surface and the socket within the bearing bracket 44 has a corresponding surface so that the bearing 42 has universal movement within the bracket 44.

An additional bearing bracket 46 is arranged on the axle housing 14 and depends downwardly therefrom. A pair of frame bracket 48 and 50 are detachably connected to the bearing brackets 44 and 46 respectively by bolts 52 and 54 respectively. The frame bracket 48 extends downwardly and has its lower ends secured to a U-girder 52 which forms part of a track frame. The frame bracket 50 extends downwardly and outwardly and has its lower ends secured to a U-girder 54 which forms part of the track frame. The U-girders 52 and 54 are connected on their upper sides by a plate 56 which lends stability to the track frame. A plurality of idler rollers 58 are rotatably journaled within bearing lugs 60 carried by the U-girders 52 and 54. A pair of end rollers 59 are also mounted on the girders 52 and 54 by bearing blocks 61. The idler rollers 58, and rollers 59 and sprocket wheel 30 serve to receive and endless track 62 carrying grouser plates 64.

In order to maintain the sprocket wheel 30 in its proper position when removed from the hub 26, an additional sprocket wheel support is provided in the form of a bearing shell 66 which is supported by right angle brackets 68. The brackets 68 are secured to the frame bracket 48 by bolts 70 which extend through suitable openings provided in the brackets 68 and through elongated vertical slots 72 provided in the frame bracket 48. The bearing shell 66 is secured to the horizontal legs of the brackets 68 by bolts 74 which extend through suitable openings provided in the bearing shell and through elongated slots 76 provided in the horizontal legs of the brackets 68. The slots 76 permit the bearing shell 66 to be moved horizontally toward and away from the sprocket wheel while the slots 72 permit vertical adjustment of the bearing shell 66 to bring it into engagement with the shoulder 36 provided on the sprocket wheel.

In order to remove the endless track attachment from the axle 12 when converting to the conventional wheels, it is only necessary to adjust the bearing shell 66 to bring it into engagement with the shoulder 36, remove the bolts 54 securing the frame bracket 50 to the bearing bracket 46 and to remove the bolts 32 securing the sprocket wheel 30 to the hub 26. The entire endless track attachment can then be withdrawn laterally, the sprocket wheel 30 being supported in its proper position by the bearing shell 66. The conventional wheel can then be secured to the hub 26. The endless track attachment can also be remounted on the axle 12 as a single unit as opposed to the prior endless track attachments which had to be broken down into the components by removing the track and sprocket. It can thus be seen that the endless track attachment according to the present invention results in a considerably savings in time and effort when converting to and from an endless track drive.

A second embodiment of the invention in which the bearing shell is replaced by roller supports is illustrated in FIGS. 3 and 4. As illustrated in FIGS. 3 and 4, a vertical support 78 is mounted on the plate 56 and carries a pair of rollers 80. The rollers 80 are mounted on the support 78 by bolts which extend through horizontal slots 82 so that they can be moved toward and away from the shoulder 36 of the sprocket wheel 30. When the rollers 80 are moved into engagement with the shoulder 36, they will support the sprocket wheel 30 in the same manner as the previously described shell bearing 66 so that the endless track attachment 10 can be attached or removed as a single unit.

While only two embodiments of the invention have been illustrated and described, it will be apparent to those skilled in the art that various modifications can be made without departing from the underlying principles of the invention.

I claim:

1. An endless track attachment for a vehicle having a drive axle mounted within a housing and projecting from the end thereof, a hub mounted on the projecting end of the axle, and a mounting bracket carried by the housing, the attachment comprising: a drive sprocket removably secured to the hub and having a stub axle projecting from one side thereof substantially coaxially with the drive axle; a bearing having a spherical outer race positioned over the stub axle; a bearing bracket positioned over the bearing; an elongated frame carrying a plurality of idler rollers positioned beneath the drive sprocket; a pair of frame brackets secured to the frame; one of the frame brackets being removably connected to the mounting bracket and the other being secured to the bearing bracket; a flexible endless track trained over the sprocket and rollers; and means carried by one of the frame brackets and frame to maintain the sprocket in position when removed from the hub.

2. The attachment set forth in claim 1 wherein the last-mentioned means is vertically and horizontally adjustable.

3. The attachment set forth in claim 2 wherein the means to maintain the sprocket in position when removed from the hub includes a semispherical bearing shell mounted on the other frame bracket.

4. The attachment set forth in claim 1 wherein the last-mentioned means includes a pair of rollers carried by the frame and adapted to engage an annular shoulder on he the drive sprocket.

5. The attachment set forth in claim 1 wherein the drive sprocket is provided with an annular shoulder and the last-mentioned means engages the shoulder to support the drive sprocket when removed from the hub.

6. The attachment set forth in claim 5 wherein the means to maintain the drive sprocket in position includes a semicylindrical bearing shell carried by the other frame bracket.

7. The attachment set forth in claim 6 wherein the bearing shell is carried by the other frame bracket for horizontal movement toward and away from the drive sprocket and for vertical adjustment into engagement with the shoulder.

8. The attachment set forth in claim 5 wherein the means to maintain the drive sprocket in position includes a pair of horizontally spaced rollers carried by the frame and adapted to engage the annular shoulder on opposite sides of its bottom center.

9. The attachment set forth in claim 8 wherein the rollers are mounted on the frame for horizontal movement.